A. ROESCH.
MEASURING INSTRUMENT.
APPLICATION FILED NOV. 9, 1918.
1,351,130.
Patented Aug. 31, 1920.
2 SHEETS—SHEET 1.
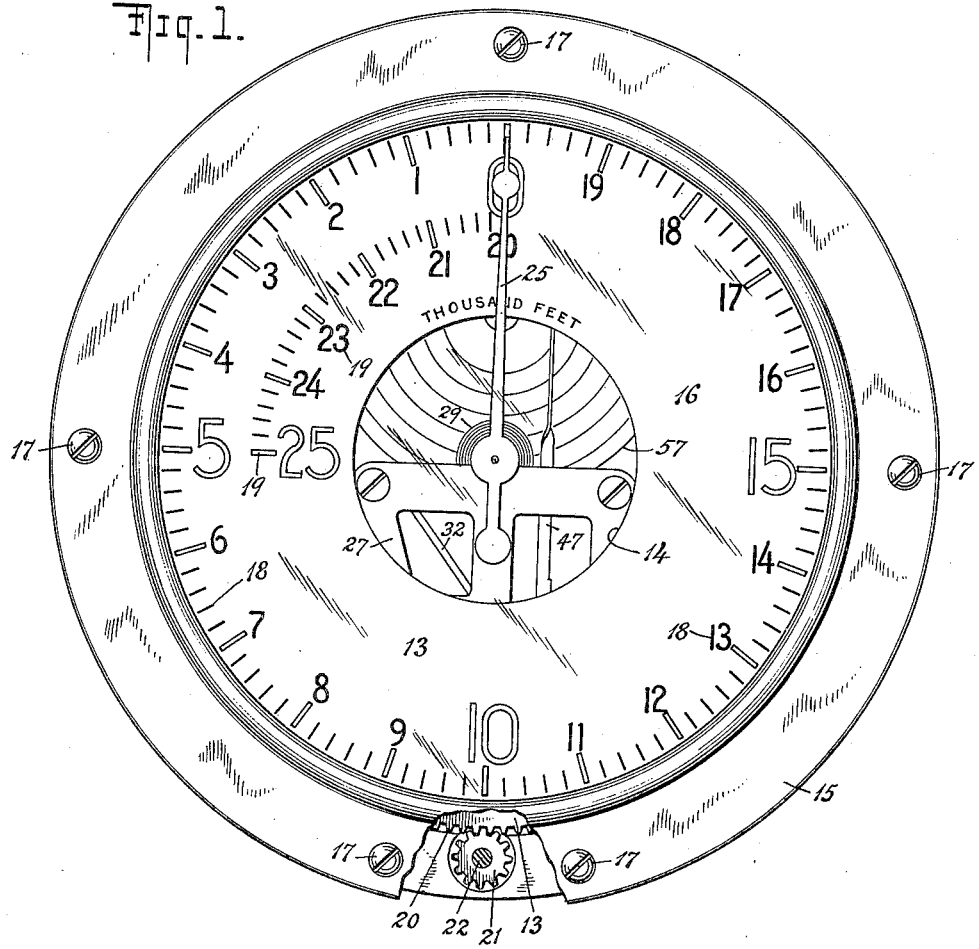
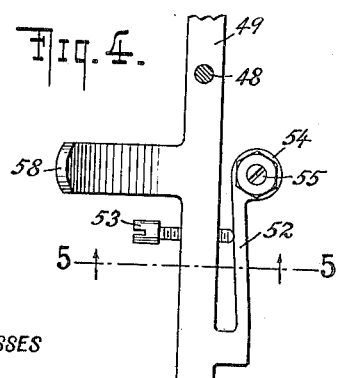
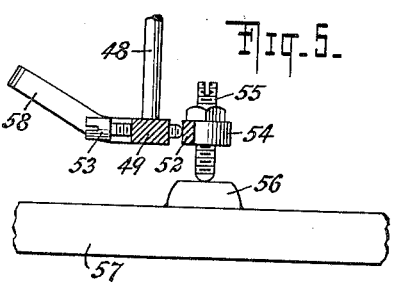
WITNESSES
INVENTOR
Alfred Roesch
BY
ATTORNEYS

A. ROESCH.
MEASURING INSTRUMENT.
APPLICATION FILED NOV. 9, 1918.

1,351,130.

Patented Aug. 31, 1920.
2 SHEETS—SHEET 2.

WITNESSES

INVENTOR
Alfred Roesch
BY
ATTORNEYS

UNITED STATES PATENT OFFICE.

ALFRED ROESCH, OF BROOKLYN, NEW YORK, ASSIGNOR TO CHARLES J. TAGLIABUE MANUFACTURING CO., OF BROOKLYN, NEW YORK, A CORPORATION OF NEW YORK.

MEASURING INSTRUMENT.

1,351,130.      Specification of Letters Patent.      Patented Aug. 31, 1920.

Application filed November 9, 1918. Serial No. 261,774.

*To all whom it may concern:*

Be it known that I, ALFRED ROESCH, a citizen of the United States, and resident of Brooklyn, county of Kings, city and State of New York, have invented certain new and useful Improvements in Measuring Instruments, of which the following is a specification.

My invention relates to measuring instruments of the type in which an indicating hand or pointer coöperates with a circular scale graduated or arranged in accordance with the species of measuring for which the instrument is intended. The object of my invention is to produce an instrument of the indicated kind having a maximum of efficiency and accuracy under all conditions and in which the mechanism, whereby the hand or pointer is operated, is reduced to the simplest form. Other more specific objects of my invention will appear from the description hereinafter and the features of novelty will be pointed out in the appended claims.

Figure 2:
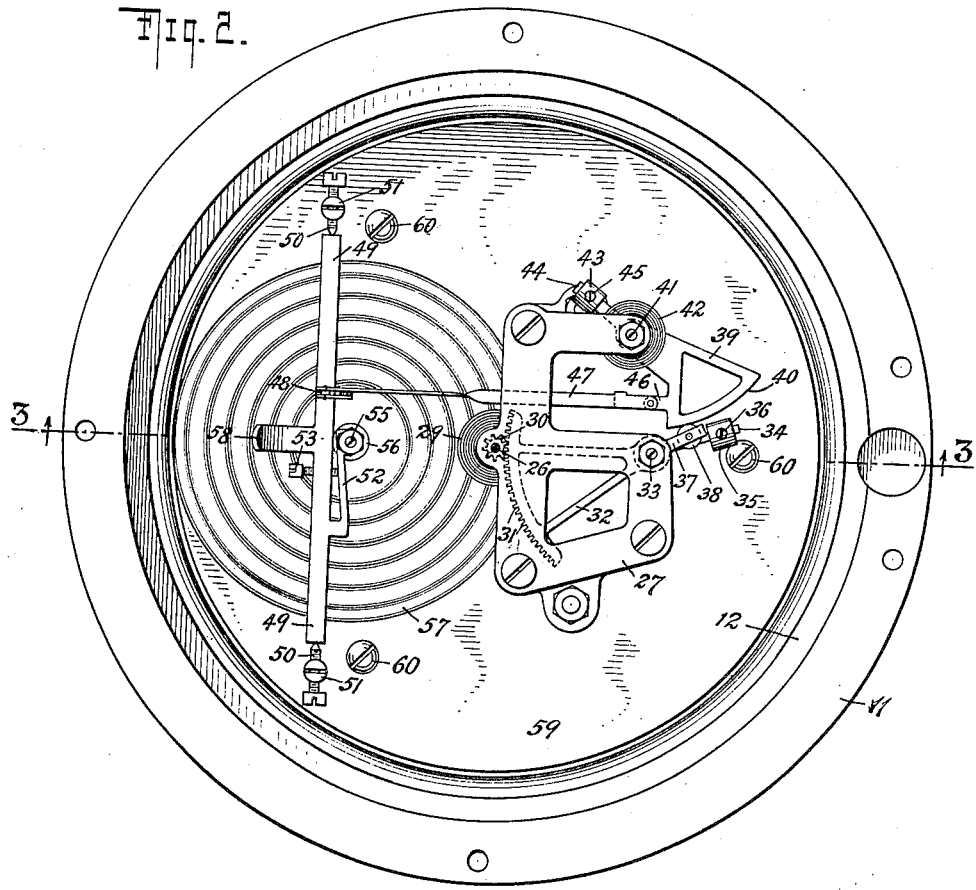
Figure 3:
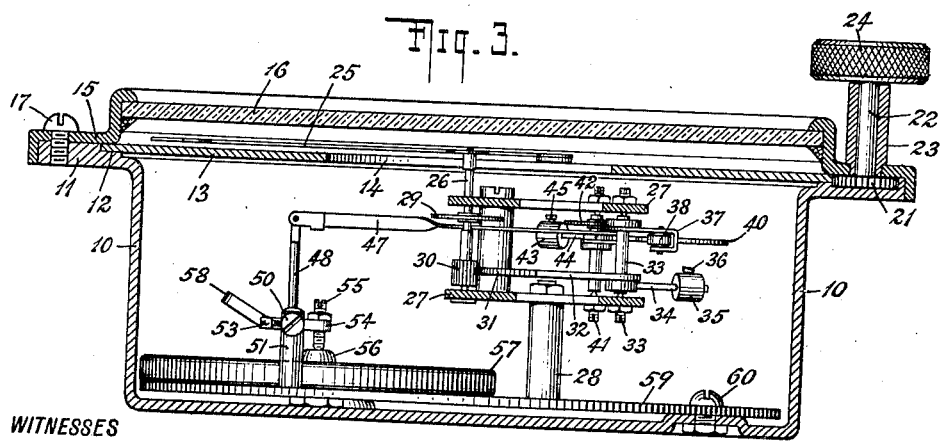

In the accompanying drawings, for the purposes of illustration and description, I have shown an example of my invention, embodied in an aneroid or altimeter, my improved construction being particularly adapted to this type of measuring instrument. In said drawings Figure 1 is a face view of the complete instrument; Fig. 2 is a similar view with the scale-dial and cover removed; Fig. 3 is a sectional view on the line 3—3 of Fig. 2 and Figs. 4 and 5 are detail views on an enlarged scale.

As shown in the illustrated example, the measuring instrument comprises a casing 10 of suitable shape and construction and provided at its front with an annular flange 11 and a contiguous circumferential recess 12 as shown in Figs. 2 and 3. A scale-dial 13 having a central aperture 14 rests in the recess 12 and is held therein by the annular rim 15 of the transparent cover 16, the latter being secured in place by means of screws 17 which pass through the rim 15 into the flange 11. The dial 13, in the illustrated example is provided with a scale section 18 and a continuing scale section 19, the whole comprising a complete scale arranged to indicate altitudes in thousands of feet and fractions thereof and reading from zero to twenty-five, as shown in Fig. 1. In the specific instrument chosen for illustration, the scale-dial 13 is formed with teeth 20 which mesh with a pinion 21 carried by a stem 22 rotatably mounted in a sleeve 23 which projects from and is secured to or forms part of the cover rim 15. In order to provide for the ready manipulation of the pinion 21, a preferably knurled head 24 is secured upon the outer end of the stem 22; with this arrangement the dial 13 may be adjusted in a circumferential direction, in the recess 12, by simply rotating the head 24 and thereby causing a rotation of the pinion 21 which transmits its movement to the dial 13 through the medium of the teeth 20.

The instrument further includes an indicating hand or pointer 25 coöperating with the scale 18, 19 and carried by a shaft 26 which extends through the dial aperture 14 and is suitably journaled in a framework 27 mounted upon standards 28 in the interior of the casing 10. A coil-spring 29 having its one end connected with the shaft 26 and its other end connected at a suitable point, with the framework 27, serves to maintain the pointer 25 in and to return it to its normal position in registry with the zero indication on the scale-section 18.

A pinion 30 is carried by the shaft 26 and meshes with the teeth 31 of a segment 32 mounted upon a shaft 33 suitably journaled in the framework 27; in the preferred construction a rod 34 projects radially from the segment 32, as shown in Fig. 2, and carries a counterweight 35, the latter being adjustably secured upon said rod 34, for instance, by means of a set screw 36. An arm 37 is secured upon the shaft 33 and projects radially therefrom in a direction opposite to that in which the segment 32 extends from said shaft, the arm 37, at its free end preferably being provided with a roller 38, as shown in Fig. 2. The roller 38 is in operative engagement with a cam 39 having an active surface 40 and is maintained in such engagement by the action of the spring 29, said cam 39 being secured upon a shaft 41 which is also suitably journaled in the framework 27. A coil-spring 42 having its one end secured to the shaft 41 and its other end fastened to a suitable portion of the framework 27 serves, in addition to its other functions referred to farther on, to maintain the cam 39 in its normal position and to return it to said normal position. As shown in Fig. 2, a counterweight 43 is adjustably mounted upon an arm 44 which forms a continuation of and projects from the cam 39; the counterweight 43 may be secured in its adjusted position upon the arm 44 in any suitable manner, as for instance, by means of a set screw 45. The counterweights 35 and 43 serve to balance the segment 32 and cam 39 respectively. The cam 39 is formed with a lug 46, it being understood that the cam 39, arm 44 and lug 46, may be stamped or otherwise constructed from sheet metal or other suitable material.

A link 47 has its one end pivotally connected with the lug 46 and its other end pivotally secured to a member 48 carried by a rock-shaft 49 journaled upon bearing screws 50 which extend through posts 51 in screw-threaded engagement therewith, as shown in Fig. 2. A resilient member 52, comprising an integral portion of the shaft 49, extends lengthwise thereof and is adjustable toward and away from said shaft by means of an adjusting screw 53, for the purposes to be more fully described hereinafter. At its free end the member 52 is formed with a head 54 for the accommodation of a screw 55 which projects through said head and is in screw-threaded engagement therewith. The end of said screw 55 bears against a bearing member 56 carried by the bellows 57 and is maintained in contact therewith by the action of the spring 42, said bellows, as usual in instruments for measuring altitudes, comprising a hollow element from which the air has been exhausted. The bellows 57 is thus maintained in a collapsed condition by atmospheric pressure, the degree or extent of compression depending upon the altitude and the consequent density or rarity of the atmosphere. As illustrated in Figs. 2 and 3, an integral projection 58 extends from the rock shaft 49.

In the preferred construction, particularly in instruments for measuring altitudes, the entire interior mechanism contained in the casing 10, including the pointer 25, is mounted upon a plate 59 secured to the back of the casing 10 in any suitable manner as by bolts and nuts 60. With this arrangement the complete mechanism may be removed as a unit from the casing by simply removing the bolts and nuts 60.

At the normal altitude at which the atmospheric pressure is approximately fifteen pounds to the square inch, the pointer 25 is in registry with the zero indication on the scale-section 18; if the registration of these elements is not accurate the scale-dial 13 may be circumferentially shifted in the recess 12, by actuating the pinion 21 in the proper direction through the medium of the head 24 and stem 21, or the screw 55 may be adjusted as will be more fully described hereinafter. As the instrument is carried to progressively higher altitudes in which the density of the air decreases, the atmospheric pressure upon the bellows 57 becomes correspondingly less, so that said bellows gradually expands. In expanding, in the manner set forth, the bearing member 56 of said bellows exerts a pressure upon the screw 57 and thereby rocks the shaft 49 upon the bearing screws 50; this actuation of said shaft 49 is in a direction to cause the member 48 to exert a pull upon the link 47, which in turn swings the cam 39 in the arc of a circle against the tension of the spring 42.

As the cam 39 is thus actuated, a pressure is exerted thereby, toward the left in Fig. 2, upon the roller 38, this being due to the contour and shape of the active surface 40 of said cam 39. In this manner the arm 37 is swung to the left in said figure and, as a result, the segment 32 is rocked toward the right in said Fig. 2 against the tension of the spring 26, the shaft 33 partaking of this movement of said segment. Because of the engagement of the segment teeth 31, with the pinion 30, the latter is rotated toward the left in Fig. 2 against the tension of the spring 28; as the pinion 30 is fast upon the shaft 26, the rotation thereof also causes said shaft 26 to rotate in its bearings and thus moves the pointer 25 in a circular path along the scale section 18 and if a high enough altitude is reached to cause said pointer to describe more than a complete revolution, it is caused to move also along and coöperate with the scale-section 19. Upon the return, as the instrument reaches progressively lower altitudes, the atmospheric pressure upon the bellows 57 is gradually increased whereby said bellows are correspondingly compressed. The bearing member 56 thus moves in a direction away from the screw 55, which however follows this movement under the influence of the coil-spring 42 and remains in contact with said member 56; as a result of this the parts describe a return movement and finally come to rest in their normal positions. The screw 55 is maintained in contact with the member 56 and the return movement of the parts is assisted by the action of the springs 28 and 42.

By adjusting the screw 55, in one direction or the other, the shaft 49 is rocked relatively to the bellows 57 and through the medium of the member 48 and link 47 adjusts or sets the cam 39 to different starting positions relatively to the roller 38; at the same time this shifting of the cam 39 acts upon said roller 38 and arm 37 and through the medium of the segment 32 and pinion 30 also sets the pointer 25 to different initial positions. The adjustment of the screw 55 may, in addition to its other functions, be utilized also to bring the pointer into proper registry with the zero mark on the scale.

The member 52 may be moved toward or away from the shaft 49, within the limits of its adjustment, by adjusting the screw 53 thus bringing said member and with it the screw 55 nearer to or farther away from the axis of rotation of said shaft 49; in this way the speed of rotation of the pointer 25 may be increased or diminished, as will be apparent. In other words, the farther away the screw 55 is from the axis of rotation of the shaft 49 the slower will be the movement of the pointer 25 through the medium of the bellows 57; contrariwise the nearer said screw 55 is to said axis of rotation the greater will be the speed of travel of said pointer. A simple adjustment of the screw 53 may thus be utilized to cause the pointer to gradually gain or lose in speed, in its travel along the scale, if such variations are necessary or desired, for instance, to compensate for inaccuracies in the operation of the instrument. My invention thus does away with the intricate and delicate adjusting mechanisms which are found in existing instruments and which, in addition to the difficulties of manipulation, are easily disarranged and injured.

The construction also reduces the actuation mechanism to an extremely simple form of maximum efficiency. It has been found in practice that the successive steps in expanding and contracting, due to progression from one altitude to progressively higher or lower altitudes, may vary in different bellows, this being due to the construction thereof and to different physical characteristics of the material of which the bellows are made. In existing instruments because of the arrangement and construction of the actuating mechanism, this faulty operation of the bellows at best can be corrected only with difficulty because of the complexity of the mechanism and ofttimes is transmitted to the pointer with the result that the readings are at times inaccurate and unreliable. With my invention, the cam 39 may be readily arranged to compensate for this lack of uniformity in the operation of the bellows, the desired results being readily ascertainable by test. The form of the cam may be such as to meet any conditions and provide for any type of movement or travel in the pointer, thus making it possible to use any type of scale or any combination of scales whereby the predetermined readings or measurements, of whatever kind they may be, are readily obtained. The arrangement also permits the scale to be graduated evenly throughout its entirety; in many existing measuring instruments, this being particularly true of aneroids or altimeters, it is necessary, in order to secure the intended coöperation between the pointer and the scale, to gradually and progressively bring the graduations of the latter closer together from zero upward, or in other words the scale must be made to fit the indication movements of the pointer, when absolute accuracy is desired.

My invention avoids any positive connection between the pointer actuating means and the means for operating said actuating means and itself operated by the action of the bellows. It will be apparent that my invention, although it may be particularly adapted for use in aneroids or altimeters, is equally well adapted for use in the construction of other types of measuring instruments and the claims are to be construed accordingly.

Various changes in the specific construction shown and described may be made within the scope of the claims without departing from the spirit of my invention.

I claim:

1. In a measuring instrument, the combination of a scale, a pointer coöperating therewith, a shaft carrying said pointer, a pinion on said shaft, a toothed segment in mesh with said pinion, a cam for operating said segment whereby said pointer is actuated, a rock-shaft extending transversely to said pointer shaft, a link connecting said cam and rock-shaft and means located adjacent to said rock-shaft for actuating the same whereby said cam is operated to actuate said segment and pointer.

2. In a measuring instrument, the combination of a scale, a pointer coöperating therewith, a shaft carrying said pointer, a pinion on said shaft, a toothed segment in mesh with said pinion, a cam for operating said segment whereby said pointer is actuated, a rock-shaft, a link connecting said cam and rock-shaft, and a bellows controlling the operation of said rock-shaft.

3. In a measuring instrument, the combination of a scale, a pointer coöperating therewith, a shaft carrying said pointer, a pinion on said shaft, a toothed segment in mesh with said pinion, a cam for operating said segment whereby said pointer is actuated, a rock-shaft, a link connecting said cam and rock-shaft, a bellows, a resilient member carried by said rock-shaft and extending lengthwise thereof, an adjustable member carried by said resilient member and engaging said bellows and an adjusting screw carried by said rock-shaft whereby said resilient member and with it said adjustable member is moved toward and away from the axis of said rock-shaft.

4. In a measuring instrument, the combination of a scale, a pointer coöperating therewith, mechanism for actuating said pointer, a bellows, a rock-shaft connected with said mechanism, a resilient member carried by said rock-shaft and extending lengthwise thereof, said member being operatively connected with said bellows and a screw carried by said shaft for adjusting said member toward and away from the axis of rotation of said shaft whereby the speed of travel of said pointer is varied.

5. In a measuring instrument, the combination of a scale, a pointer coöperating therewith, mechanism for actuating said pointer, a bellows, a rock-shaft connected with said mechanism, a resilient member carried by said shaft and extending lengthwise thereof, a screw carried by said member and engaging said bellows, said screw being adjustable to vary the relation between said bellows and said mechanism and a second screw carried by said shaft for adjusting said member and said first screw toward and away from the axis of said shaft to vary the speed of travel of said pointer.

6. An instrument for measuring altitudes comprising a casing, a dial carried thereby and having a scale thereon, a pointer coöperating with said scale, a framework in said casing, a shaft carrying said pointer and journaled in said framework a coil-spring connected with said shaft and with said framework, a pinion on said shaft, a toothed segment meshed with said pinion, a second shaft journaled in said framework and carrying said segment, an adjustable counterweight connected with said segment, an arm secured upon said second shaft, a roller mounted upon said arm, a cam engaging said roller, a third shaft journaled in said framework and carrying said cam, an adjustable counterweight connected with said cam, a coil-spring connected with said third shaft and with said framework, a rock-shaft, a link connecting said cam and rock-shaft, a bellows normally collapsed and arranged to expand as the atmospheric pressure decreases, a resilient member carried by said rock-shaft and extending lengthwise thereof, an adjustable screw carried by said member and engaging said bellows, said screw being adjustable to vary the position of said cam relatively to said roller, and a second screw carried by said rock-shaft for adjusting said member and first screw toward and away from the axis of said shaft to vary the speed of travel of said pointer.

In testimony whereof I have hereunto set my hand.

ALFRED ROESCH.